US012472754B2

(12) United States Patent
Teoh

(10) Patent No.: US 12,472,754 B2
(45) Date of Patent: Nov. 18, 2025

(54) OUTPUT ROLLER ALTERATIONS BASED ON DRYING TIMES

(71) Applicant: Hewlett-Packard Development Company, L.P., Spring, TX (US)

(72) Inventor: Wei Lit Teoh, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 139 days.

(21) Appl. No.: 18/683,417

(22) PCT Filed: Aug. 16, 2021

(86) PCT No.: PCT/US2021/046106

§ 371 (c)(1),
(2) Date: Feb. 13, 2024

(87) PCT Pub. No.: WO2023/022701

PCT Pub. Date: Feb. 23, 2023

(65) Prior Publication Data

US 2024/0383265 A1 Nov. 21, 2024

(51) Int. Cl.
*B41J 11/00* (2006.01)
*B41J 3/60* (2006.01)
*B41J 13/00* (2006.01)
*B41J 13/03* (2006.01)
*B41J 13/10* (2006.01)

(52) U.S. Cl.
CPC ............... *B41J 11/002* (2013.01); *B41J 3/60* (2013.01); *B41J 13/0036* (2013.01); *B41J 13/0045* (2013.01); *B41J 13/03* (2013.01); *B41J 13/106* (2013.01)

(58) Field of Classification Search
CPC ........ B41J 11/002; B41J 3/60; B41J 13/0036; B41J 13/0045; B41J 13/03; B41J 13/106
See application file for complete search history.

(56) References Cited

U.S. PATENT DOCUMENTS 6,702,274 B1 3/2004 Otsuka
2004/0217541 A1* 11/2004 Horio ........................ B65H 3/46 271/121

(Continued)

FOREIGN PATENT DOCUMENTS

CN 108688353 A 10/2018
JP 2007-161467 A 6/2007

(Continued)

*Primary Examiner* — Henok D Legesse
(74) *Attorney, Agent, or Firm* — Brooks, Cameron & Huebsch, PLLC

(57) ABSTRACT

In some examples, the disclosure describes a printing device that includes a processor resource, and a non-transitory memory resource storing machine-readable instructions stored thereon that, when executed, cause the processor resource to: estimate a drying time of a print medium received at an output roller from a print zone, activate the output roller at a first speed to move the print medium to an output tray in response to receiving the print medium from the print zone, alter a direction of the output roller to move the print medium toward a turn roller at a second speed based on the drying time of the print medium, and stop the output roller to prevent the print medium from reaching the turn roller for a period of time based on the drying time.

15 Claims, 5 Drawing Sheets

(56) References Cited

U.S. PATENT DOCUMENTS

| | | | | |
|---|---|---|---|---|
| 2006/0039707 | A1 | 2/2006 | Mima | |
| 2006/0238594 | A1 | 10/2006 | Tham et al. | |
| 2007/0063429 | A1 | 3/2007 | Kang | |
| 2007/0071462 | A1 | 3/2007 | Koitabashi | |
| 2010/0141700 | A1* | 6/2010 | Mizutani | B41J 11/002 347/16 |
| 2011/0267396 | A1* | 11/2011 | Yamamoto | B41J 13/0045 347/16 |
| 2011/0273524 | A1 | 11/2011 | Kawamata et al. | |
| 2012/0188592 | A1 | 7/2012 | Handley et al. | |
| 2016/0288546 | A1 | 10/2016 | Mizutani et al. | |
| 2017/0282601 | A1 | 10/2017 | Boland et al. | |
| 2018/0118491 | A1 | 5/2018 | Wang et al. | |
| 2018/0281471 | A1 | 10/2018 | Ito et al. | |
| 2019/0283993 | A1 | 9/2019 | Tanabe et al. | |

FOREIGN PATENT DOCUMENTS

| | | | |
|---|---|---|---|
| JP | 2008-080808 | A | 4/2008 |
| WO | 2019/221709 | A1 | 11/2019 |
| WO | 2020/005287 | A1 | 1/2020 |

* cited by examiner

OUTPUT ROLLER ALTERATIONS BASED ON DRYING TIMES

BACKGROUND

Inkjet printers can deposit quantities of printing fluid onto a printable media (e.g., paper, plastic, etc.). In some examples, inkjet printers can create a curl and/or cockle in the printed media when the printing fluid droplets are deposited by the inkjet printer. In some examples, a number of physical properties of the printable media can be changed when the printing fluid droplets are deposited by the inkjet printer. For example, the stiffness of the printable media can be changed when the printing fluid droplets are deposited by the inkjet printer.

DETAILED DESCRIPTION

Figure 1:
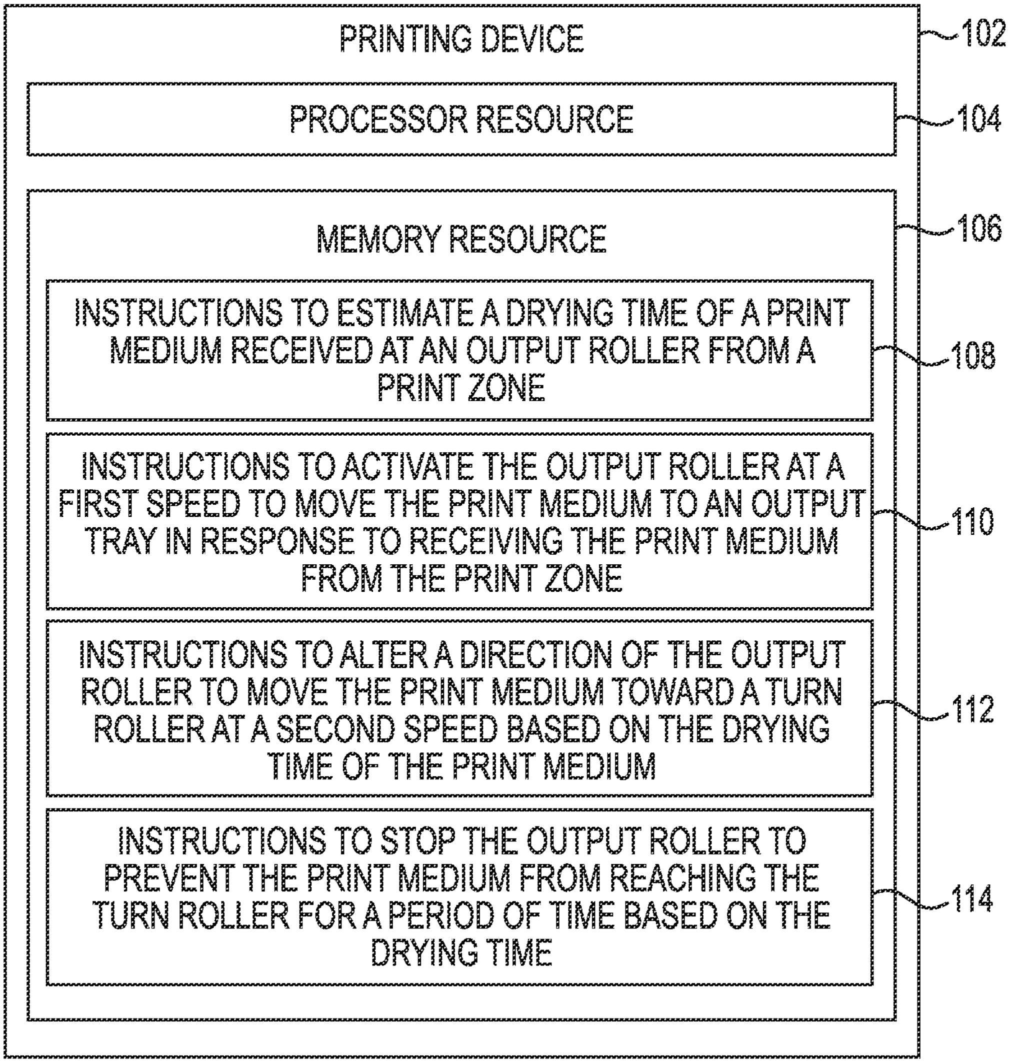
FIG. 1 illustrates an example of a printing device for providing output roller alterations based on drying times.

A user may utilize a computing device for various purposes, such as for business and/or recreational use. As used herein, the term computing device refers to an electronic device having a processor and a memory resource. Examples of computing devices can include, for instance, a laptop computer, a notebook computer, a desktop computer, and/or a mobile device (e.g., a smart phone, tablet, personal digital assistant, smart glasses, a wrist-worn device, etc.), among other types of computing devices. Computing devices can be utilized to generate digital images that can be transferred to a printing device (e.g., inkjet printing device, laser printing device, etc.). In these examples, the printing device can generate a printed image of the digital image on a substrate (e.g., paper, plastic, print medium, print media, etc.).

An inkjet printing device can include a print zone to deposit a printing fluid on a print media. The print zone of the inkjet printing device can deposit the printing fluid to generate partially dried inkjet media. In some examples, the partially dried inkjet media can provide difficulties when stacking, aligning, and/or finishing. For example, the partially dried inkjet media can have distorted properties such as a curl, a cockle, a reduction in stiffness, increased surface roughness, extruding or protruding fibers from the surface, misaligned fibers, and/or increased sheet to sheet friction of the media. In some examples, these distorted properties can be caused by printing fluid deposited on the media and the media absorbing the printing fluid. For example, the printing fluid can be in a liquid state that can be absorbed by a media such as paper. In this example, the liquid state of the printing fluid can cause the distorted properties of the media in a similar way that other liquids may distort the properties of the media.

In some examples, an inkjet printing device can utilize duplex printing. As used herein, duplex printing includes depositing a print substance on multiple sides of a print substrate. For example, duplex printing can include depositing a print substance on a first side of print media, flipping the print media to a second side, and depositing a print substance on a second side of the print media. In this example, the first side can be designated a top side and the second side can be designated a bottom side. In some examples, the distorted properties of the print medium or wetness of the print substance can prevent a duplex printing job to be performed on the second side of the print media without creating a jam of the printing device or damaging the image on the first side. For these reasons, the printing device can wait for the print media to dry from the print substance deposited on the first side before depositing the print substance on the second side of the print media.

In some examples, an output roller of the printing device can be utilized to transfer the print media from a print zone to an output tray of the printing device. As used herein, the print zone can be an area of the printing device where print substance is deposited on to a print medium. For example, the print zone of an inkjet printing device can be a location where dispensers (e.g., inkjet pens, etc.) can deposit ink on to a surface of the print medium. As used herein, the output tray of the printing device can be a location where completed print jobs are provided to allow a user to receive the completed print jobs. In some examples, the output roller can position a portion of the print media within the output tray to allow a duplexer to shift positions and allow the output roller to move the print media to the duplexer path and return the print media to the print zone through a turn roller. In these examples, the output roller can allow the print media to dry partially placed in the output tray before moving the print media to the turn roller and back to the print zone to deposit print substance on a second side or opposite side of the print media. This can be problematic when a user confuses the partially positioned print media within the output tray for a completed print job and interacts with the print media before the print job is complete. For example, the user can pull on the print media and remove the print media from the output roller before the print substance is applied to the second side of the print media.

The present disclosure relates to altering a speed of the output roller to allow the print media to move toward the turn roller at a relatively slow speed to notify a user that the print job is not complete while still allowing enough time for the print media to dry before reaching the turn roller. The drying time can be a quantity of time to allow the print medium to be provided to the print zone without damaging the print medium. For example, the drying time for a piece of print media can start at a time when the print substance is applied to the print medium at the print zone and end when the print medium is ready to be provided to a turn roller or other roller of the printing device to perform a duplexer process.

In some examples, the drying time for particular print medium can be determined based on a quantity of print substance applied to the print medium and/or the type of print medium. In this way, the drying time can be utilized to determine the speed of the output roller for moving the print medium toward the output tray and/or toward the duplex path to the turn roller. In this way, the movement speed of the print medium can be adjusted based on the drying time and keep the print medium moving during a transition from a print path to a duplex path during a duplex print job. This can provide an indication to the user that the print job associated with the print medium is not complete and to allow the printing device to continue the print job.

FIG. 1 illustrates an example of a printing device 102 for providing output roller alterations based on drying times. In some examples, the printing device 102 can include a processor 104 and a memory resource 106 to store instructions that can be executed by the processor 104. In some examples, the printing device 102 can include mechanical components that can generate images on a substrate. For example, the printing device 102 can include inkjet pens that can deposit a print substance on a substrate such as paper. In some examples, the printing device 102 can include a computing device that includes a processor 104 and a memory resource 106 storing instructions 108, 110, 112, 114 that can be executed by the processor 104 to perform particular functions.

The printing device 102 can include instructions 108 stored by the memory resource 106 that can be executed by the processor 104 to estimate a drying time of a print medium received at an output roller from a print zone. As described herein, the print zone can include print substance dispensers such as inkjet pens that can deposit a print substance on to a surface of the print medium. In some examples, the type of print substance, type of print medium, quantity of print substance, and/or density of print substance can be utilized to estimate a drying time of the print medium.

In some examples, the estimated drying time can be a quantity of time the print medium is to wait in order to allow the print substance to dry to a state that can allow the print medium to be printed on an opposite side through a duplex printing process. In some examples, the quantity of drying time can be utilized to determine a wait time for providing the print medium to a turn roller to return the print medium to the print zone to allow the print zone to deposit additional print substance on an opposite side of the print medium.

The printing device 102 can include instructions 110 stored by the memory resource 106 that can be executed by the processor 104 to activate the output roller at a first speed to move the print medium to an output tray in response to receiving the print medium from the print zone. As described herein, the output roller can be a roller that is moveable in a first direction to move print media toward an output tray of the printing device 102 and moveable in a second direction to move the print media toward a duplex print path. In some examples, the output roller can move in the first direction at the first speed. In some examples, the first direction can be in a direction to move the print medium toward to the output tray of the printing device 102. In some examples, the first speed can be a default speed that may be utilized to transfer the print medium from the print zone to the output tray when the print job associated with the print medium is a single side print job or a non-duplex print job. In this way, the first speed may not be altered or affected by the drying time of the print medium.

In other examples, the printing device 102 can determine when the print medium is to be part of a duplex print job where the print medium is to be provided to a duplex print path and provided back to the print zone by the output roller and turn roller. In these examples, the first speed can be a speed that is based on the drying time of the print medium. In this way, the first speed can be based on a quantity of time associated with the drying time and a travel time at a particular speed from the print zone to the duplex path and/or to the turn roller. In this way, the first speed can be slower or faster than a default speed for the output roller such that print medium is continuously moved by the output roller in the first direction and then reversed in the second direction to provide the print medium to the duplex print path. In these examples, the print medium can be provided to the duplex path and back to the turn roller at a time that is at or exceeds the quantity of time of the estimated drying time such that the print medium can be utilized to deposit additional print substance on the opposite side of the print medium.

The printing device 102 can include instructions 112 stored by the memory resource 106 that can be executed by the processor 104 to alter a direction of the output roller to move the print medium toward a turn roller at a second speed based on the drying time of the print medium. As described herein, the turn roller can be utilized to alter a direction to move the print medium toward the turn roller through a duplex print path. In some examples, a duplexer can be utilized to switch the print path from a first print path to receive the print medium from the print zone to a second print path (e.g., duplex print path, duplex path, etc.) to allow the output roller to provide the print medium to the second print path or duplex print path such that the print medium can be provided to the turn roller and return to the print zone.

In some examples, the second speed can be based on the drying time associated with the print medium. In some examples, the second speed can be different than the first speed. For example, the first speed can be based on the drying time, but not necessarily. In this way, the second speed can be utilized to continuously move the print media during the drying time of the print medium. In some examples, the output roller may not stop the print medium to dry outside the enclosure of the printing device 102 or within the output tray of the printing device 102. That is, the output roller can move the print medium toward the output roller at a speed that allows the quantity of time associated with the drying time to expire prior to providing the print medium to the turn roller and returned to the print zone.

In some examples, the second speed can be based on a distance between the output roller and a point before the turn roller such that the speed of the print medium can be altered by the speed of the output roller to allow the print medium to continue moving without reaching the point before the turn roller before the drying time. For example, the distance between the turn roller and the point before the turn roller can be utilized to determine a quantity of time it will take the print medium to reach the point before the turn roller at different speeds. In this example, the second speed can be selected to move the print medium at a speed that will not reach the point before the turn roller before the quantity of time associated with the drying time of the print medium. In this way, the print medium can continue to move from the print zone to the turn roller to indicate to a user that the print job is not completed for the print medium and to not interfere with the print medium.

The printing device 102 can include instructions 114 stored by the memory resource 106 that can be executed by the processor 104 to stop the output roller to prevent the print medium from reaching the turn roller for a period of time based on the drying time. In some examples, the output roller can be stopped when the print medium reaches the point before the turn roller or a point before the turn roller interacts with the print medium when the drying time has not expired. In this way, a relatively large portion of the print medium can be positioned within the enclosure of the printing device 102 to continue drying. In these examples, the user may still be notified that the print job associated with the print medium is not complete since the majority of the print medium is positioned within the enclosure of the printing device 102.

In some examples, the print medium can be positioned within a duplex print path of the printing device 102 to allow the drying time to expire before activating the output roller to provide the print medium to the turn roller. In this way, the print medium is allowed to dry to a point that can allow the printing device 102 to deposit a print substance on the opposite side of the print medium and prevent potential user interference with the print medium by protecting the print medium within the duplex print path.

As described herein, the printing device 102 can include computing device that can include a processor 104 communicatively coupled to a memory resource 106. The computing device can include components such as a processor 104. As used herein, the processor 104 can include, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 108, 110, 112, 114. In other examples, the computing device can include instructions 108, 110, 112, 114, stored on a machine-readable medium (e.g., memory resource 106, non-transitory computer-readable medium, etc.) and executable by a processor 104. In a specific example, the computing device utilizes a non-transitory computer-readable medium storing instructions 108, 110, 112, 114 that, when executed, cause the processor 104 to perform corresponding functions.

Figure 2:
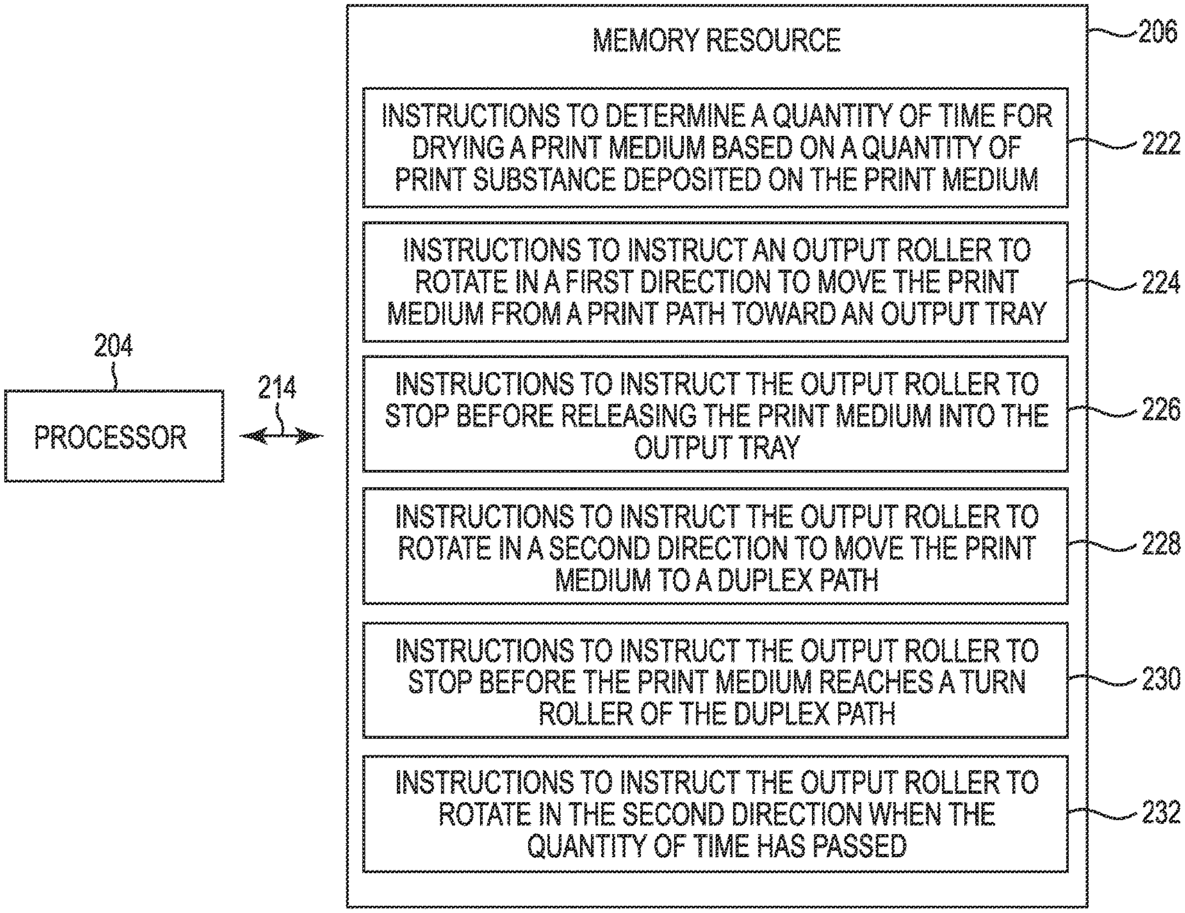
FIG. 2 illustrates an example of a memory resource for providing output roller alterations based on drying times.

FIG. 2 illustrates an example of a memory resource 206 for providing output roller alterations based on drying times. In some examples, the memory resource 206 can be a part of a computing device or controller that can be communicatively coupled to a computing system. For example, the memory resource 206 can be part of a printing device 102 as referenced in FIG. 1. In some examples, the memory resource 206 can be communicatively coupled to a processor 204 that can execute instructions 222, 224, 226, 228, 230, 232 stored on the memory resource 206. For example, the memory resource 206 can be communicatively coupled to the processor 204 through a communication path 214. In some examples, a communication path 214 can include a wired or wireless connection that can allow communication between devices and/or components within a single device.

The memory resource 206 may be electronic, magnetic, optical, or other physical storage device that stores executable instructions. Thus, a non-transitory machine-readable medium (MRM) (e.g., a memory resource 206) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 206) may be disposed within a controller and/or computing device. In this example, the executable instructions 222, 224, 226, 228, 230, 232, can be “installed” on the device. Additionally, and/or alternatively, the non-transitory machine-readable medium (e.g., a memory resource) can be a portable, external or remote storage medium, for example, that allows a computing system to download the instructions 222, 224, 226, 228, 230, 232, from the portable/external/remote storage medium. In this situation, the executable instructions may be part of an “installation package”. As described herein, the non-transitory machine-readable medium (e.g., a memory resource 206) can be encoded with executable instructions for altering a dynamic power reduction mode of a radio.

In some examples, the memory resource 206 can include instructions 222 to determine a quantity of time for drying a print medium based on a quantity of print substance deposited on the print medium. As described herein, the quantity of time for drying the print medium can be based on a number of factors. In some examples, the quantity to time for drying the print medium can be an estimated quantity of time that the print medium is to wait before being provided to the turn roller and/or provided to the print zone and allow the print zone to deposit additional print substance on the opposite side of the print medium.

In some examples, the number of factors can include a type of print substance deposited on the print medium. For example, a first type of print substance can dry on a surface of the print medium at a different rate than a second type of print substance. In a similar way, a first type of print medium can have a different drying rate than a second type of print medium when using the same type of print substance. In this way, the plurality of factors can be utilized together to determine the particular quantity of time it may take for the print medium to dry or dry to a point where the print medium can be utilized in a duplex print process. In some examples, the quantity of time can be greater for a print medium that includes a greater quantity or greater density of print substance deposited on the print substance compared to a print medium that includes a lower quantity or lower density of print substance deposited on the print medium.

In some examples, the memory resource 206 can include instructions 224 to instruct an output roller to rotate in a first direction to move the print medium from a print path toward an output tray. As described herein, the output roller can receive the print medium from the print zone of a print path. In some examples, the output roller can rotate in the first direction to move the print medium to the output tray of the printing device. In some examples, the output roller can move the print medium to a point that allows a duplexer to switch from the print path to the duplex path as described further herein. In these examples, a portion of the print medium can be positioned within the output tray.

In some examples, the memory resource 206 can include instructions 226 to instruct the output roller to stop before releasing the print medium into the output tray. As described herein, the output roller can be stopped when a trailing edge of the print media moves past the duplexer of the printing device. In some examples, the duplexer can switch from a first position to a second position. In these examples, the first position can allow the print medium to be provided to the output roller and the second position can allow the print medium to be provided to a duplex print path to be provided to a turn roller.

As described herein, previous printing devices and systems can allow the output roller to remain stopped until the print medium is dry or allowed to dry to a point that the print medium can be utilized for a duplex print job. In these examples, a larger area of the print medium can be outside of the enclosure of the printing device compared to a smaller area of print medium positioned within the enclosure of the printing device. In this way, a user can more easily interact with the print medium when the relatively larger area is outside the printing device.

In some examples, the memory resource 206 can include instructions 228 to instruct the output roller to rotate in a second direction to move the print medium to a duplex path. In some examples, the output roller can begin to rotate in the second direction prior to the print medium being dry or ready to be provided to the turn roller of the printing device. That is, the estimated drying time may not be met or exceeded when the output roller begins to rotate in the second direction. In some examples, the output roller can rotate in the second direction at a speed based on the drying time or remaining quantity of time to dry the print medium.

In some examples, the memory resource 206 can include instructions 230 to instruct the output roller to stop before the print medium reaches a turn roller of the duplex path. As described herein, the output roller can stop prior to the print medium reaching the turn roller of the duplex path to prevent damage to the print medium, which can be caused by the turn roller or print zone when the print medium is not dry or dry enough to perform a duplex process. For example, the turn roller can have a pinch force that can smear the print substance on the print medium when the print substance is not at a drying point. In another example, the distorted properties of the print medium due to the applied print substance can cause a jam or other malfunction when interacting with the pinch force of the turn roller or other roller of the printing device. In this way, a first portion of the print medium can be positioned within the printing device a second portion can be positioned outside the printing device. In these examples, the first portion can be relatively larger than the second portion.

In some examples, the output roller can stop to allow the print medium to dry with the first portion of the print medium positioned within the enclosure of the printing device. As described herein, a relatively large portion of the print medium can be positioned within the duplex path of the printing device to protect the print medium from user interference while the print medium is in a drying state. In some examples, the print medium can be stopped at a stopping point before the turn roller to prevent the print medium from interacting with the turn roller until the drying time or quantity of time for drying the print medium is exceeded.

In some examples, the memory resource 206 can include instructions 232 to instruct the output roller to rotate in the second direction when the quantity of time has passed. As described herein, when the quantity of time associated with the drying time of the print medium has passed or has been exceeded, the print medium can be provided to the turn roller to allow the turn roller to provide the print medium to the print zone. In some examples, the turn roller can provide the print medium to the print zone to allow the print zone to deposit additional print substance on a second side or opposite side of the print medium.

Figure 3:
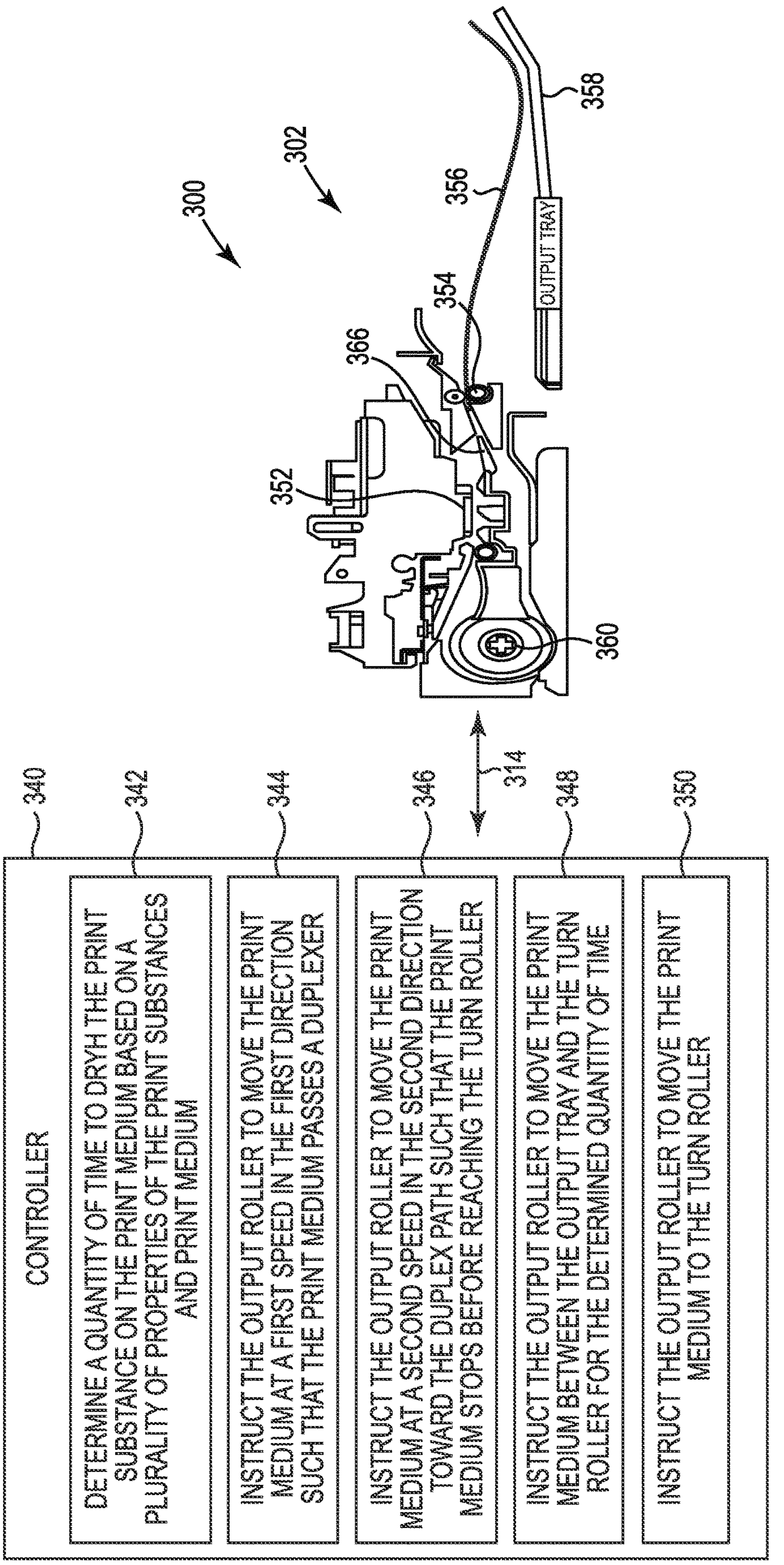
FIG. 3 illustrates an example of a system for providing output roller alterations based on drying times.

FIG. 3 illustrates an example of a system 300 for providing output roller alterations based on drying times. In some examples, the system 300 can include a printing device 302 and a controller 340 for executing instructions associated with the printing device 302. The controller 340 can be communicatively coupled to the printing device 302 through a communication path 314. The printing device 302 can include a print zone 352 to deposit a print substance on a print medium 356.

In some examples, the printing device 302 can include an output roller 354 that can move the print medium 356 from the print zone 352 to an output tray 358 when rotating in a first direction. In addition, the printing device 302 can include a duplexer 366 that can alternate between a first position to allow the print medium 356 to travel from the print zone 352 to the output roller 354 and a second position to allow the print medium 356 to travel from the output roller 354 to a turn roller 360. In some examples, the turn roller 360 can move the print medium 356 back to the print zone 352.

The controller 332 can be a device that includes a processor communicatively coupled to a memory resource. In other examples, the controller 332 can be a device that includes hardware, such as an ASIC to perform particular functions 342, 344, 346, 348, 350. In some examples, the controller 332 can perform the functions for the printing device 302 through a communication path 314. In some examples, the controller 332 can be a device within the enclosure of the printing device 302.

At 342, the controller 332 can include instructions to determine a quantity of time to dry the print substance on the print medium 356 based on a plurality of properties of the print substance and print medium 356. As described herein, the quantity of time it takes for a print medium 356 to dry or be able to be printed on again after being deposited with a print substance can be based on a plurality of properties or factors. For example, the type of print substance utilized can affect drying, the type of print medium 356 utilized can affect drying, the quantity or density of the print substance applied to the print medium 356 can affect drying, among other properties of the print process. These properties of the print process on a first side of the print medium 356 can be utilized to predict or estimate a quantity of time it will take for the print medium 356 to sufficiently dry and be utilized for a duplex printing process.

At 344, the controller 332 can include instructions to instruct the output roller 354 to move the print medium 356 at a first speed in the first direction such that the print medium 356 passes a duplexer 366. As described herein, the output roller 354 can move the print medium 356 toward the output tray 358 in a first direction. In some examples, the output roller 354 can move the print medium 356 to a location such that the trailing edge of the print medium 356 passes the duplexer 366. This can allow the duplexer 366 to switch from a first position that allows the print medium 356 to pass to the output roller 354 to a second position that allows the print medium 356 to be moved toward a turn roller 360.

As described herein, the first speed can be a default speed or speed that the output roller 354 would utilize to output the print medium 356 on to the output tray 358 when the print job is complete. In other examples, the first speed can be altered to a different speed based on the drying time or quantity of time it will take to sufficiently dry the print medium 356 to be utilized for a duplex printing process. In some examples, the first speed can be different than a second speed utilized to move the print medium 356 toward the turn roller 360.

At 346, the controller 332 can include instructions to instruct the output roller 354 to move the print medium 356 at a second speed in the second direction toward the duplex path such that the print medium stops before reaching the turn roller 360. In some examples, the second speed can be slower than the first speed to increase a quantity of time it takes for the print medium 356 to reach the turn roller 360. As described herein, the second speed can be based on the quantity of time to dry the print medium 356. In this way, the print medium 356 can be moved at a particular speed to reach the turn roller 360 after the quantity of time dry the print medium 356. In some examples, the second speed can be based on a quantity of time remaining from the drying time when the output roller 354 begins to move at the second speed in the second direction.

In this way, the print medium 356 can continue to move for a longer period of time without stopping to wait for the drying time to be exceeded. In some examples, the continuous movement of the print medium can provide visual feedback to a user that the print process is continuing and that the printing device 302 is functioning properly or without error. In some instances, stopping the movement of the print medium 356 can be an indication of a failure or error by the printing device 302 even when the stoppage is due to waiting for the print medium 356 to dry before continuing the duplex printing process.

At 348, the controller 332 can include instructions to instruct the output roller 354 to move the print medium 356 between the output tray 358 and the turn roller 360 for the determined quantity of time. In some examples, the controller 332 can instruct the output roller 354 to move the print medium 356 back and forth between the output tray 388 and the turn roller 360 until the determined quantity of time or drying time has been exceeded. In this way, the print medium 356 can continue to move during the drying time without stalling or stopping the print medium 356 in a particular location during the dry time.

At 350, the controller 332 can include instructions to instruct the output roller 354 to move the print medium 356 to the turn roller 360. When the drying time has been exceeded or met, the output roller 354 can be activated to move the print medium 356 to a point to interact with the turn roller 360. In these examples, the print medium 356 can be in a state that can be utilized for a duplex print process. Thus, the turn roller 360 can move the print medium 356 to the print zone 352 to allow the print zone 352 to deposit a print substance on the second side of the print medium 356. In these examples, the print medium 356 can be moved to the output roller 354 and the output roller 354 can move the print medium 356 into the output tray 358. In these examples, the output roller 354 can completely release the print medium 356 into the output tray 358 to allow a user to collect the completed print job on the print medium 356.

Figure 4:
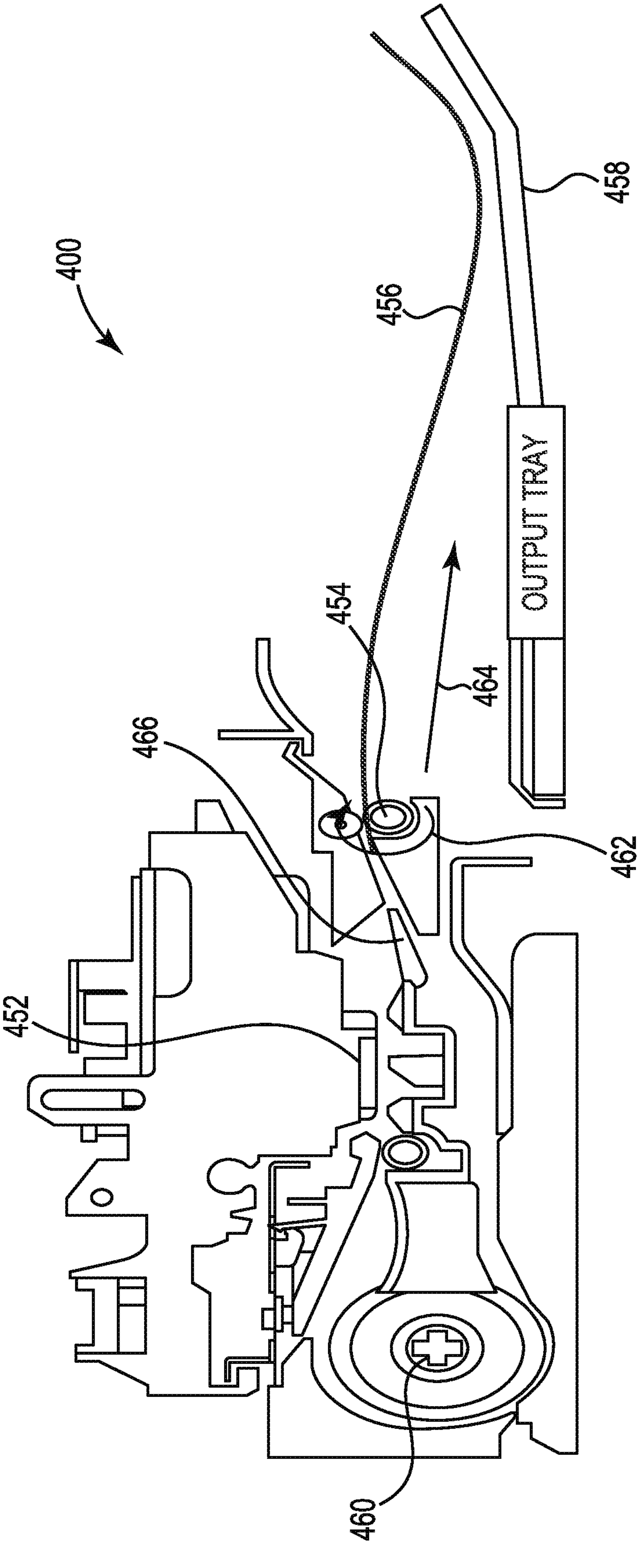
FIG. 4 illustrates an example of a system for providing output roller alterations based on drying times.

FIG. 4 illustrates an example of a system 400 for providing output roller alterations based on drying times. In some examples, the system 400 can be a printing device as described herein. In some examples, the printing device can be an inkjet printing device that can deposit ink on a surface of a print medium 456 at a print zone 452 to generate images on the print medium 456. In some examples, the print medium 456 can have a first quantity of print substance deposited on a first side of the print medium 456 at the print zone 452 and transferred to an output roller 454.

The output roller 454 can receive the print medium 456 from the print zone 452 and move the print medium toward the output tray 458 by rotating in the direction of arrow 462. In some examples, the direction of arrow 462 can be a first direction that can be utilized to move the print medium 456 in the direction of arrow 464 at a first speed. In this way, the output roller 454 can rotate at a first speed in the direction of arrow 462 to move the print medium 456 in the direction of arrow 464. In some examples, the output roller 454 can move the print medium 456 in the direction of arrow 464 until a trailing edge of the print medium 456 moves past a duplexer 466.

As described herein, allowing the print medium 456 to pass the duplexer 466 can allow the duplexer 466 to move from a first position to a second position and provide access to a duplexer print path back to the turn roller 460. As illustrated in FIG. 4, a relatively large portion of the print medium 456 can be positioned within the output tray 458 while a relatively small portion of the print medium 456 can be positioned within the printing device or pinched by the output roller 454. In some examples, the output roller 454 can move in an opposite direction as arrow 462 when the trailing edge of the print medium 456 passes the duplexer 466. This will be illustrated further in FIG. 5.

Figure 5:
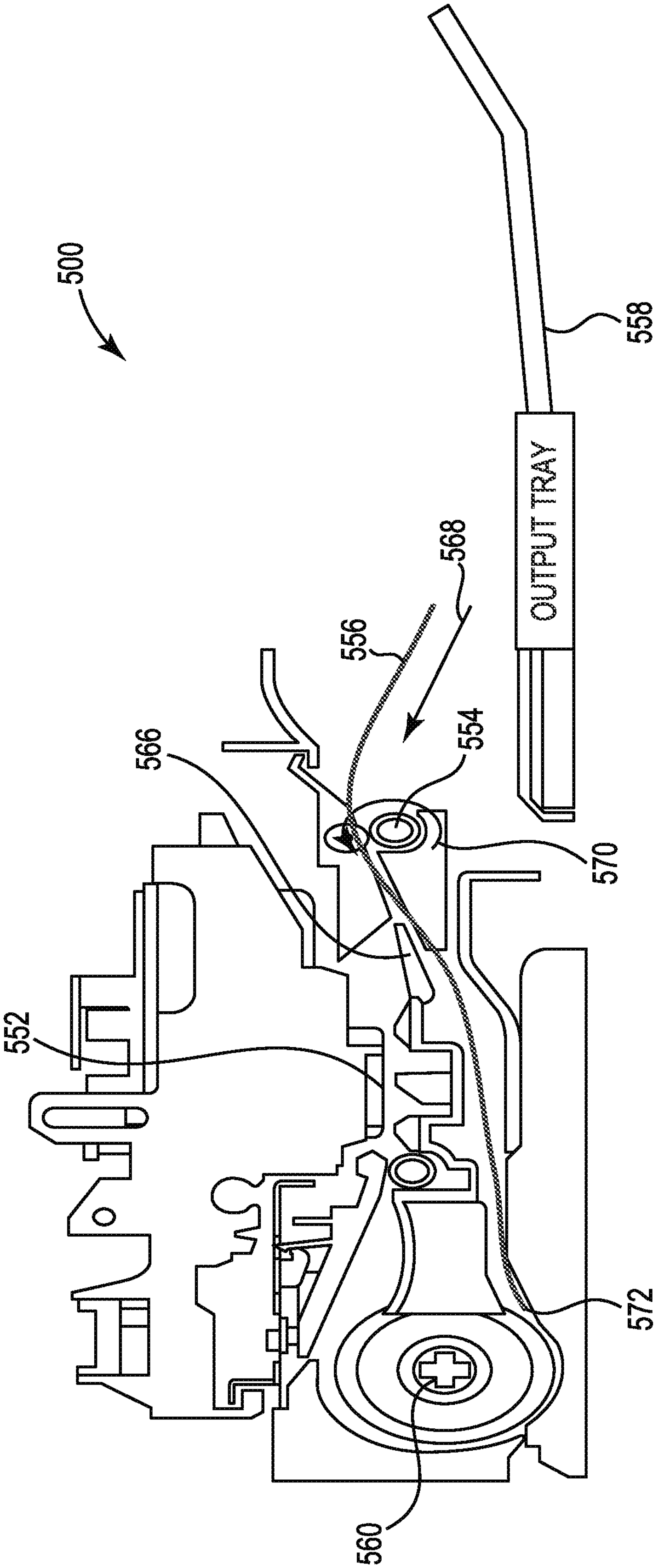
FIG. 5 illustrates an example of a system for providing output roller alterations based on drying times.

FIG. 5 illustrates an example of a system 500 for providing output roller alterations based on drying times. In some examples, the system 500 can include the same or similar elements as system 400 as referenced in FIG. 4. For example, the system 500 can illustrate when the output roller 554 (e.g., output roller 454 as illustrated in FIG. 4) alters from a first direction to a second direction to move the print medium 556 through a duplex print path to a turn roller 560.

As described herein, the system 500 can include a print zone 552 that can deposit a print substance on the print medium 556. The print medium 556 can be moved to the output roller 554 to move the print medium 556 partially into the output tray 558 as illustrated by FIG. 4. When the print medium 556 moves past the duplexer 566, the duplexer 566 can switch to a second position to allow the print medium 556 to enter a duplex print path toward the turn roller 560. In order to move the print medium 556 toward the turn roller 560, the output roller 554 can rotate in the direction of arrow 570 to move the print medium 556 in the direction of arrow 568.

As described herein, the output roller 554 can stop the print medium 556 at a point 572 before allowing the print medium 556 to interact with the turn roller 560. In this way, the print medium 556 can either be stopped to allow the print medium 556 to dry within the duplex print path or the output roller 554 can move the print medium 556 back toward the output tray 558 before returning the print medium 556 back to the turn roller 560 when the dry time has been met or exceeded for the print medium 556. As described herein, the speed of the output roller 554 can be based on a drying time of the print medium 556.

In some examples, a first distance exists between the print zone 552 and the output roller 554 and a second distance exists between the output roller 554 and the turn roller 560. As described herein, the first distance and the second distance can be utilized to determine the speed of the output roller 554 to maintain movement of the print medium 556 during the drying time of the print medium 556. In some examples, the speed of the output roller 554 can be based on a distance between the output roller 554 and the point 572 prior to reaching the turn roller 560. For example, the speed of the print medium 556 can correspond to the rotational speed of the output roller 554. In this example, the speed of the print medium 556 can be altered by altering the rotational speed of the output roller 554 such that print medium 556 with move the distance between the output roller 554 and the point 572 after the quantity of time to dry the print medium 556 has been met or exceeded.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. A printing device, comprising:
- a processor resource; and
- a non-transitory memory resource storing machine-readable instructions stored thereon that, when executed, cause the processor resource to:
  - estimate a drying time of a print medium received at an output roller from a print zone;
  - activate the output roller at a first speed to move the print medium to an output tray in response to receiving the print medium from the print zone;
  - alter a direction of the output roller to move the print medium toward a turn roller at a second speed based on the drying time of the print medium; and
  - stop the output roller to prevent the print medium from reaching the turn roller for a period of time based on the drying time.

2. The printing device of claim 1, wherein the second speed is slower than the first speed.

3. The printing device of claim 1, wherein the second speed is to move the print medium to reach the turn roller at the drying time of the print medium.

4. The printing device of claim 1, wherein the drying time is a quantity of time to allow the print medium to be provided to the print zone without damaging the print medium.

5. The printing device of claim 1, wherein the first speed is based on the drying time.

6. The printing device of claim 1, wherein the output roller is stopped to allow the print medium to dry for the period of time based on the drying time within an enclosure of the printing device.

7. The printing device of claim 6, wherein a portion of the print medium is positioned outside of the enclosure of the printing device during the period of time.

8. A non-transitory memory resource storing machine-readable instructions stored thereon that, when executed, cause a processor of a computing device to:
- determine a quantity of time for drying a print medium based on a quantity of print substance deposited on the print medium;
- instruct an output roller to rotate in a first direction to move the print medium from a print path toward an output tray;
- instruct the output roller to stop before releasing the print medium into the output tray;
- instruct the output roller to rotate in a second direction to move the print medium to a duplex path;
- instruct the output roller to stop before the print medium reaches a turn roller of the duplex path; and
- instruct the output roller to rotate in the second direction when the quantity of time has passed.

9. The memory resource of claim 8, wherein the processor is to:
- determine a first speed of the output roller to rotate in the first direction based on the quantity of time; and
- determine a second speed of the output roller to rotate in the second direction based on the quantity of time.

10. The memory resource of claim 8, wherein the quantity of time is based on a type of print medium.

11. The memory resource of claim 8, wherein the quantity of time is an estimated quantity of time the print medium will take to dry after the print substance is deposited on the print medium.

12. A system, comprising:
- a print zone to deposit a print substance on a print medium;
- an output roller to move the print medium from the print zone to an output tray when rotating in a first direction and to move the print medium from the output tray to a turn roller within a duplex path when rotating in a second direction; and
- a controller to:
  - determine a quantity of time to dry the print substance on the print medium based on a plurality of properties of the print substance and print medium;
  - instruct the output roller to move the print medium at a first speed in the first direction such that the print medium passes a duplexer;
  - instruct the output roller to move the print medium at a second speed in the second direction toward the duplex path such that the print medium stops before reaching the turn roller;
  - instruct the output roller to move the print medium between the output tray and the turn roller for the determined quantity of time; and
  - instruct the output roller to move the print medium to the turn roller.

13. The system of claim 12, wherein the second speed is slower than the first speed to increase a quantity of time it takes for the print medium to reach the turn roller.

14. The system of claim 13, wherein the controller is to instruct the output roller to alternate between the first direction and the second direction within a threshold period of time to maintain movement of the print medium between the print zone and the output tray and between the output tray and the turn roller.

15. The system of claim 12, comprising a first distance exists between the print zone and the output roller and a second distance exists between the output roller and the turn roller.

* * * * *